United States Patent
Rosén et al.

(10) Patent No.: US 10,666,041 B2
(45) Date of Patent: May 26, 2020

(54) LIQUID SYSTEM TOOL HAVING AN INTEGRATED RESIDUAL CURRENT DEVICE

(71) Applicant: HUSQVARNA AB, Huskvarna (SE)

(72) Inventors: Magnus Rosén, Alingsås (SE); Johan Linnér, Lindome (SE); Johan Berg, Alingsås (SE)

(73) Assignee: Husqvarna AB, Huskvarna (SE)

(*) Notice: Subject to any disclaimer, the term of this patent is extended or adjusted under 35 U.S.C. 154(b) by 0 days.

(21) Appl. No.: 16/341,115

(22) PCT Filed: Oct. 13, 2017

(86) PCT No.: PCT/SE2017/051008
§ 371 (c)(1),
(2) Date: Apr. 11, 2019

(87) PCT Pub. No.: WO2018/070929
PCT Pub. Date: Apr. 19, 2018

(65) Prior Publication Data
US 2019/0348831 A1 Nov. 14, 2019

(30) Foreign Application Priority Data
Oct. 13, 2016 (SE) .................... 1651345-9

(51) Int. Cl.
*H02H 7/08* (2006.01)
*H02H 1/00* (2006.01)

(52) U.S. Cl.
CPC ........ *H02H 7/0833* (2013.01); *H02H 1/0007* (2013.01)

(58) Field of Classification Search
CPC ...... H02P 1/00; H02P 1/04; H02P 1/08; H02P 1/10; H02P 1/12; H02P 1/18; H02P 1/22;
(Continued)

(56) References Cited

U.S. PATENT DOCUMENTS

| 4,870,250 A | 9/1989 | Rizzuto et al. |
| 5,113,304 A | 5/1992 | Ozaki et al. |

(Continued)

FOREIGN PATENT DOCUMENTS

| EP | 0 490 388 A2 | 6/1992 |
| EP | 0 571 657 A2 | 12/1993 |

(Continued)

OTHER PUBLICATIONS

International Type Search Report and Office Action for Swedish Application No. 1651345-9 dated May 4, 2017.
(Continued)

*Primary Examiner* — Antony M Paul
(74) *Attorney, Agent, or Firm* — Burr & Forman LLP (57) ABSTRACT

Disclosed herein is a liquid system tool having an integrated residual current device, RCD. The liquid system tool comprises a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool. The RCD comprises a sensor element connected to an output of the rectifier and an input of the voltage booster and being configured to collect an analog current signal and an analog to digital, A/D, converter configured to convert the analog current signal into a digital current signal. The integrated RCD further comprises a logic unit connected to the A/D converter, wherein the logic unit is configured to evaluate the digital current signal and compare it to a current requirement, and wherein if the logic unit determines that the digital current signal does not fulfill the current requirement, it is further configured to break the current circuit so that no current can flow in the liquid system tool. Also
(Continued)

disclosed is a method for detecting residual current in a liquid system tool, and a computer program product.

20 Claims, 6 Drawing Sheets

(58) Field of Classification Search
CPC ...... H02P 1/24; H02P 1/26; H02P 1/28; H02P 1/42; H02P 1/423; H02P 1/46; H02P 3/00; H02P 3/06; H02P 3/24; H02P 6/00; H02P 6/002; H02P 6/005; H02P 6/04; H02P 7/00; H02P 7/06; H02P 7/066; H02P 7/20; H02P 7/346; H02P 8/00; H02P 8/12; H02P 8/24; H02P 8/28; H02P 9/107; H02P 11/00; H02P 13/00; H02P 21/00; H02P 23/00; H02P 25/00; H02P 27/00; H02P 27/04; H02P 27/06; H02H 3/105; H02H 1/0015; H02H 3/165
USPC ......... 361/42, 43, 44; 76/31, 50, 119; 83/15, 83/62.1; 318/400.01, 700, 701, 721, 800, 318/801, 430, 34, 134
See application file for complete search history.

(56) References Cited

U.S. PATENT DOCUMENTS

| | | | |
|---|---|---|---|
| 5,172,329 | A | 12/1992 | Rahman et al. |
| 6,791,315 | B2 | 9/2004 | Skerritt et al. |
| 7,221,142 | B2 | 5/2007 | Murray et al. |
| 2005/0280385 | A1 | 12/2005 | Haller |

FOREIGN PATENT DOCUMENTS

| | | | |
|---|---|---|---|
| EP | 0915348 A2 * | 5/1999 | ......... F04D 15/0066 |
| WO | 2013/187837 A2 | 12/2013 | |

OTHER PUBLICATIONS

International Search Report and Written Opinion for International Application No. PCT/SE2017/051008 dated Feb. 19, 2018.
Texas Instruments, Shunt-Based Ground Fault Protection for Inverters Powered From 220-V AC Supply, Aug. 2015, http://www.ti.com/lit/ug/tidua56a/tidua56a.pdf.
Texas Instruments, Leakage Current Measurement Reference Design for Determining Insulation Resistance, Apr. 2015, http://www.ti.com/lit/ug/tidu873a/tidu873a.pdf.

* cited by examiner

LIQUID SYSTEM TOOL HAVING AN INTEGRATED RESIDUAL CURRENT DEVICE

TECHNICAL FIELD

The present invention relates generally to the field of liquid system tools. More particularly, it relates to residual current devices for electrical tools comprising a liquid system.

BACKGROUND

For so called liquid system tools, i.e. electrical handheld, portable or transportable power tools that operate with an internal or external liquid system, there are national regulations dictating that the tool should typically be equipped with a residual current device, RCD, or a ground fault circuit interrupter, GFCD (the terms may be used interchangeably in this disclosure) for protection against hazardous ground fault current, in order to be allowed to be sold and marketed.

The liquid system typically functions as a cooler or cleaner for the electrical tool, however if a fault occurs there is a risk that liquid may escape the system and that hazardous currents may be lead by the liquid to the housing of the tool and possibly harm an operator of the tool.

The RCD prevents this from happening by measuring the electric current flowing in the line conductors, or conductor wires, and comparing it to the electric current flowing in the return conductor. If the sum of these currents is not zero, then it is an indication that the current is disappearing somewhere else, typically through the protective earthed housing of the tool and possibly through the operator. When it is detected that the sum of the currents is not zero or not above a threshold value, the RCD is configured to break the power so that no current flows in the tool. The RCD will trig again until the error resulting in the leaking currents and the ground fault has been taken care of.

A typical conventional RCD is installed at the extension cord or power cable of the electrical tool or at the main power entry, and is typically not able to detect errors that occur due to smooth DCs deviating within the tool. In order to also detect that a leaking smooth DC and high frequency (HF) currents are present, an additional RCD for this purpose may be added to the regular RCD for detecting leaking DCs.

However, the typical implementation is expensive, bulky, fragile and not very suitable for handheld of portable tools in construction environments.

Therefore, there is a need for an improved RCD for ground fault protection for liquid system tools.

SUMMARY

It is an object of the teachings herein to provide a liquid system tool with a residual current device or ground fault current interrupter which enables detection of leaking alternating currents as well as leaking direct currents and high frequency currents.

According to a first aspect, this is achieved by a liquid system tool having an integrated residual current device, RCD, for protecting an operator of the liquid system tool against hazardous ground fault currents. The liquid system tool comprises a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool.

The integrated RCD comprises a sensor element connected to an output of the rectifier and an input of the voltage booster, or alternatively connected to an input of the rectifier. The sensor element is configured to collect an analog current signal. The integrated RCD also comprises an analog to digital, A/D, converter configured to convert the analog current signal into a digital current signal and a logic unit connected to the A/D converter.

The logic unit is configured to evaluate the digital current signal and compare it to a current requirement, wherein if the logic unit determines that the digital current signal does not fulfill the current requirement, it is further configured to break the current circuit so that no current can flow in the liquid system tool.

In some embodiments, the liquid system tool comprises an electrical motor, and the motor unit is a motor inverter configured to provide the motor with a high frequency current.

Thus the integrated RCD according to some embodiments may be integrated into the liquid system tool and utilize some of the components which are conventionally present within the tool.

In some embodiments, the logic unit may be connected to the circuit breaker arranged at the power input, wherein the logic unit is configured to break the current circuit by tripping the circuit breaker if the digital current signal does not fulfill the current requirement.

The breaker may e.g. be a solenoid contactor relay.

In some embodiments, the motor unit may be a motor inverter generating a high frequency current.

In some embodiments, the sensor element may comprise a pair of shunt resistors connected to the output of the rectifier, wherein the A/D-converter is configured to measure the analog current signal over the shunt resistor pair and convert the analog current signal into the digital current signal.

Alternatively, the sensor element may comprise first, second and third shunt resistors which are respectively connected to first, second and third phase lines at the output or alternatively input of the rectifier, wherein the A/D-converter is configured to measure the analog current signal over the respective shunt resistor and convert the analog current signal into the digital current signal.

In yet an alternative, the sensor element may comprise first and second shunt resistors which are respectively connected to a phase line and a neutral line at the output or alternatively input of the rectifier, wherein the A/D-converter is configured to measure the analog current signal over the respective shunt resistor and convert the analog current signal into the digital current signal.

In some embodiments, the logic unit may be configured to receive a measurement signal from at least one other component of integrated RCD and/or the liquid system tool and compare the measurement signal to the digital current signal.

In some embodiments, the at least one other component may be at least one of a voltage observer sensor and a current observer sensor.

In some embodiments, the at least one other component may be at least one of the voltage booster or the motor unit.

In some embodiments, the logic unit may be configured to determine based on the comparison of the digital current signal and the measurement signal if the sensor is operating correctly, and to break the current circuit if an error is detected.

In some embodiments, the logic unit may be configured to automatically compare the digital current signal to the measurement signal on a recurring basis.

In some embodiments, the comparison may be performed every time the liquid system tool is powered on.

In some embodiments, the electrical circuit may be driven by a one phase source or a two phase source or a three phase source, for instance over first, second and third phase lines in addition to protective earth (ground), or over a phase line and a neutral line in addition to protective earth (ground).

In some embodiments, the liquid system tool is a handheld, portable, transportable or stationary electrical power tool.

A second aspect is a method for detecting residual current in a liquid system power tool. The liquid system tool comprises a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool motor.

The method comprises collecting an analog current signal from a sensor connected to an output of the rectifier and an input of the voltage booster, or alternatively connected to an input of the rectifier, and transmitting the collected analog current signal to a logic unit connected to an analog to digital converter.

The method also comprises converting the analog current signal into a digital current signal, evaluating the digital current signal and comparing the digital current signal to a current requirement.

The method also comprises determining if the digital current signal fulfill the current requirement, and if it is determined that the digital signal current does not fulfill the current requirement, the method comprises breaking the current circuit so that no current can flow in the liquid system tool.

In some embodiments, the motor unit may be a motor inverter generating a high frequency current.

In some embodiments, the liquid system tool with its integrated RCD according to the first aspect may carry out the method according to the second aspect.

A third aspect is a computer program product comprising a computer readable medium having stored thereon a computer program comprising program instructions, wherein the computer program is loadable into a data-processing unit, wherein the computer program is stored in a memory associated to the data-processing unit, and wherein the computer program is configured to, when loaded into and run by the data-processing unit, cause the data-processing unit to execute method steps according to the second aspect.

In some embodiments, the second and third aspect may additionally share or have identical features as those described in conjunction with the first aspect.

An advantage with some of the embodiments is that a cost effective and robust RCD is enabled capable of detecting various types of currents in a liquid system tool.

Another advantage with some of the embodiments is that only one RCD is needed to detect AC-currents, DC-currents and HF-currents in a liquid system tool. Another advantage of some of the embodiments is that the RCD is integrated into the liquid system tool, resulting in that it may utilize already present conventional components in its implementation leading to cost efficiency.

Another advantage of some embodiments is that the integrated RCD is enabled to perform a self diagnosis and may continuously perform a self test of its components and functions leading to a safer device.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION OF EMBODIMENTS

The disclosed embodiments will now be described more fully hereinafter with reference to the accompanying drawings, in which certain embodiments of the invention are shown.

Figure 1:
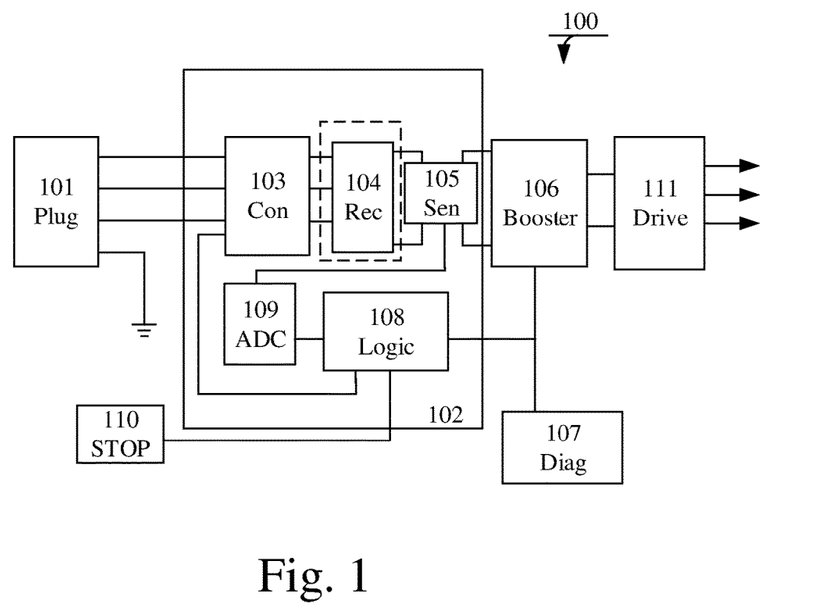
FIG. 1 shows a schematic drawing of a liquid system tool comprising an example integrated RCD according to some embodiments.

FIG. 1 shows a schematic drawing of an arrangement 100 of a liquid system tool comprising an integrated RCD 102 according to some embodiments.

The integrated RCD 102 may be integrated into a liquid system tool and utilize some of the tools conventional components. The liquid system tool may e.g. be an appliance or a machine classified as handheld, portable or transportable equipment. E.g. the liquid system tool may be a handheld chainsaw, diamond drill, jack hammer, electrical saw, surface grinder and the like.

The liquid system tool may comprise a current circuit having a power input (Plug) 101 for receiving an alternating electrical current, AC, a rectifier (Rec) 104 for rectifying the AC into a direct current, DC, a voltage booster (Booster) 106 for increasing a DC voltage and a motor unit (Drive) 111 connected to an output of the voltage booster 106 for driving the liquid system tool.

The motor unit 111 may be a motor inverter of an electrical motor comprised in the liquid system tool, configured to provide the electrical motor with a high frequency (HF) current.

Figure 7:
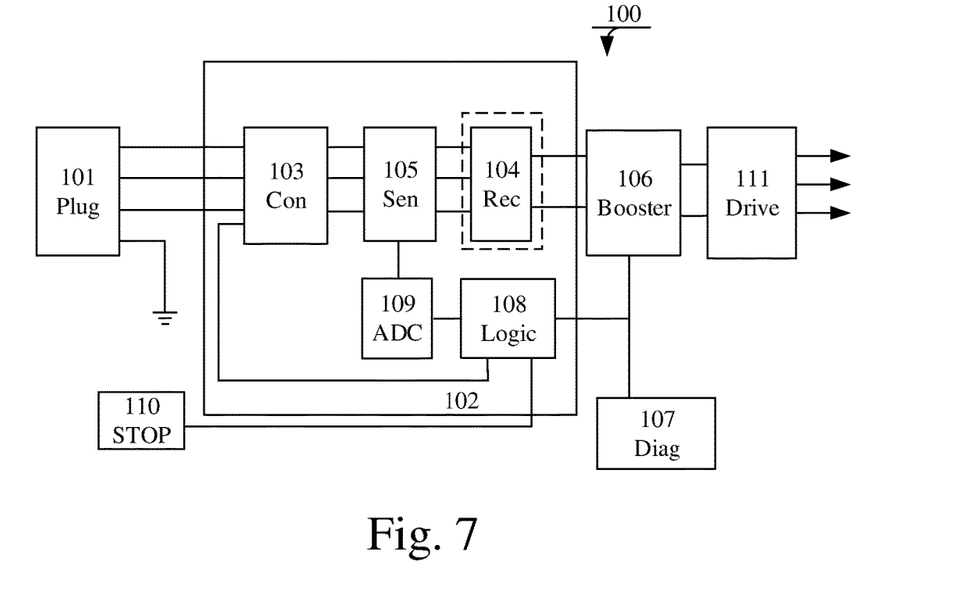
FIG. 7 shows an alternative to FIG. 1.

The integrated RCD 102 may further comprise a sensor element (Sen) 105 connected to an output of the rectifier 104 (which may be a component that is conventionally present in the liquid system tool and not necessarily a part of the integrated RCD 102 as indicated by the dashed box) and an input of the voltage booster 106 and being configured to collect an analog current signal. Alternatively, as seen in FIG. 7, the sensor element (Sen) 105 may be connected to an input of the rectifier 104.

The integrated RCD 102 may also comprise an analog to digital converter (ADC) 109 configured to convert the analog current signal into a digital current signal and a logic unit (Logic) 108 connected to the analog to digital converter 109.

The integrated RCD 102 may further comprise a solenoid contactor relay (Con) 103 configured to break the input current from the plug 101 if malfunction is detected.

In some embodiments, the arrangement 100 may further comprise a diagnosis unit (Diag) 107 configured to evaluate the performance of the logic unit 108. The arrangement 100 may further comprise a stop switch (STOP) 110 configured to cause the solenoid contactor relay (Con) 103 to trip and break the input current from the plug 101.

The output of the stop switch 110 may be evaluated by the logic unit 108 which trips the solenoid contactor relay 103 if leaking touch currents are detected.

The logic unit 108 may further be configured to evaluate the digital current signal and compare it to a current requirement, wherein if the logic unit determines that the digital current signal does not fulfill the current requirement, it is further configured to break the current circuit so that no current can flow in the liquid system tool. For instance, the logic unit may in some embodiments cause the stop switch to trigger the solenoid contactor relay 103 to trip and thus break the circuit such that the input current from the plug 101 is stopped and the liquid system tool looses power.

If the digital current signal does not fulfill the current requirement, then that is an indication that the currents flowing in the conductive wires of the liquid system tool are not equal to the current in the return conductor, which in turn is an indication that a malfunction has occurred and currents are leaking away.

The current requirement may e.g. in some embodiments be that the current flowing in the conductor wires should be equal to the current flowing in the return wire of the integrated RCD. Thus the current digital signal may represent the difference between the conductor currents and the return current. In such case, the current requirement may be that that the digital current signal is zero or a low value, and any other, or higher value will trigger the RCD to break the circuit.

In some embodiments, the digital current signal may represent a leaking current and the current requirement may be a current threshold, which the digital current signal may not exceed, such as 6 mA, 10 mA or 30 mA, or that the frequency of the leaking currents may be between 0 Hz (DC) to 100 kHz (HF). A person skilled in the art would easily realize that other values are possible, both higher and lower, and fall within the scope of the invention.

In order to break the current circuit, the logic unit 108 may output a signal to the stop switch 110, triggering it to stop the liquid system tool by causing the solenoid contactor relay 103 to trip and break the circuit.

In some embodiments, the solenoid contactor relay 103 may e.g. be a breaker or a mains contactor relay arranged at the power input, wherein the logic unit 108 is configured to break the current circuit by tripping the breaker if the digital current signal does not fulfill the current requirement.

Furthermore, as elaborated on above, the integrated RCD according to some embodiments is integrated within the liquid system tool. Thus, the RCD circuit 102 comprising the contactor 103, rectifier 104, sensor element 105, logic unit 108, analog to digital converter 109 may in some embodiments form an integrated current device (ICD). The ICD may thus constitute the actual implementation of the integrated RCD for protection against hazardous ground fault current.

Thus, the term integrated RCD may be used interchangeably with the term integrated current device (ICD) in this disclosure.

Furthermore, integrating the sensor element 105 between the rectifier 104 and the voltage booster 106 makes it possible for the integrated RCD to detect and react to both leaking alternating currents and direct currents, without having to add an extra RCD just for detecting leaking smooth DC or HF currents.

This is possible since no matter what type of current gave rise to the error, it will be reflected after the rectifier 104 where the sensor element 105 can detect it. Thus, the sensor element 105 does not have to be aware of whether it is a leaking ACs, DCs or HF currents.

In some embodiments, the logic unit 108 may be configured to continuously evaluate the digital current signal and immediately break the current circuit if the digital current signal does not fulfill the current requirement.

In some embodiments, the sensor element 105 may e.g. a current transducer comprising a pair of shunt resistors connected to the output of the rectifier, wherein the ADC 109 is configured to measure the analog current signal over the shunt resistor pair and convert the analog current signal into the digital current signal.

Alternatively, the sensor element 105 may be provided at the input of the rectifier 104, i.e. upstream of it. Three shunt resistors may be connected to respective phase lines, or two shunt resistors may be connected to a phase line and a neutral line, and the ADC 109 may, again, be configured to measure the analog current signal over the shunt resistor pair and convert the analog current signal into the digital current signal FIG. 2 shows how an integrated RCD, e.g. the integrated RCD of FIG. 1 may be integrated into a liquid system tool according to some embodiments.

Figure 2:
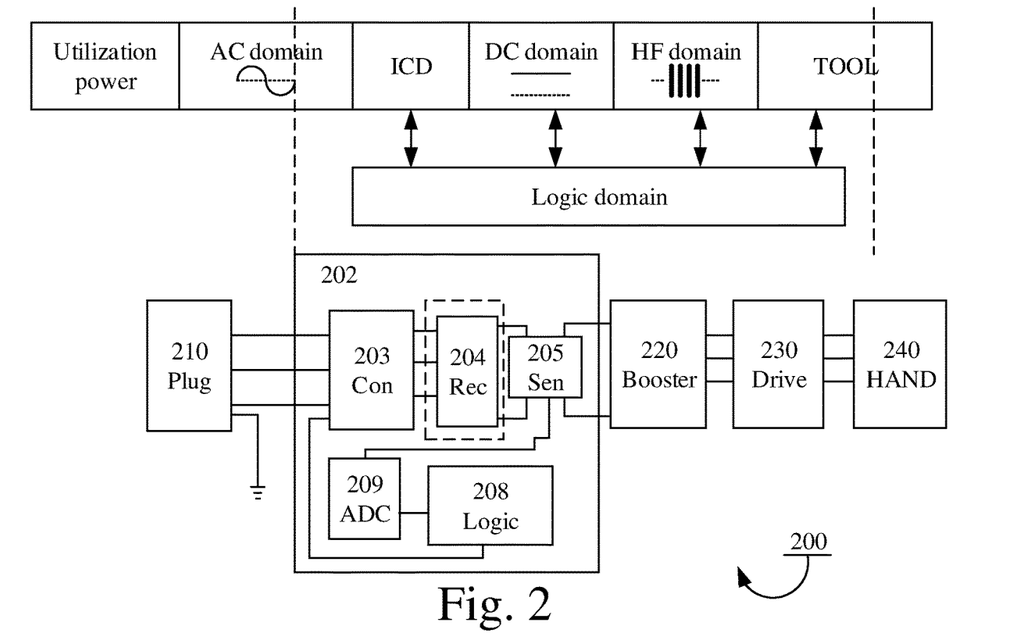
FIG. 2 shows a schematic drawing of a liquid system tool comprising an example integrated RCD according to some embodiments.

FIG. 2 illustrates a schematic view of different domains of a liquid system tool, such as the liquid system tool described in conjunction with FIG. 1. In short, the liquid system tool comprises some sort of input utilization power (e.g. one or two or three phase alternating current, plug 101 of FIG. 1) for powering the tool, an AC domain, an ICD functionality, a DC domain, a high frequency (HF) domain and a tool component (TOOL).

The ICD functionality, DC domain, HF domain and part of the tool component may all operate mainly within a logic domain, i.e. they operate digitally.

FIG. 2 further illustrates how an arrangement 200 of an integrated RCD (e.g. the integrated RCD described in conjunction with FIG. 1) comprised in a liquid system tool corresponds to the above described domains.

The arrangement 200 comprises a plug 210 for providing electrical current, an integrated RCD 202, a voltage booster 220 for increasing a DC voltage being output from the integrated RCD 202 and a motor unit (Drive) 230 connected to an output of the voltage booster 220 for driving the liquid system tool. The motor unit 230 may further be connected to a handheld part (HAND) 240 of the liquid system tool such as a housing.

In some embodiments, the motor unit 230 may be comprised in an electrical motor configured to drive the liquid system tool. The motor unit 230 may be a motor inverter configured to provide the electrical motor of the liquid system tool with a high frequency current.

The integrated RCD 202 may comprise a solenoid contactor relay (Con) 203, a rectifier (Rec) 204, a sensor element (Sen) 205, a logic unit (Logic) 208 and an analog to digital converter (ADC) 209.

The logic unit 208 may e.g. be, the logic unit 108 of FIG. 1, and may operate within the logic domain of the liquid system tool. It may thus be easily integrated into the liquid system tool and share the logic system of conventionally present components.

Furthermore, in some embodiments the logic unit 208 may receive data from several different components in order to determine if an electrical malfunction has occurred and in such case trigger the breaker.

Figure 8:
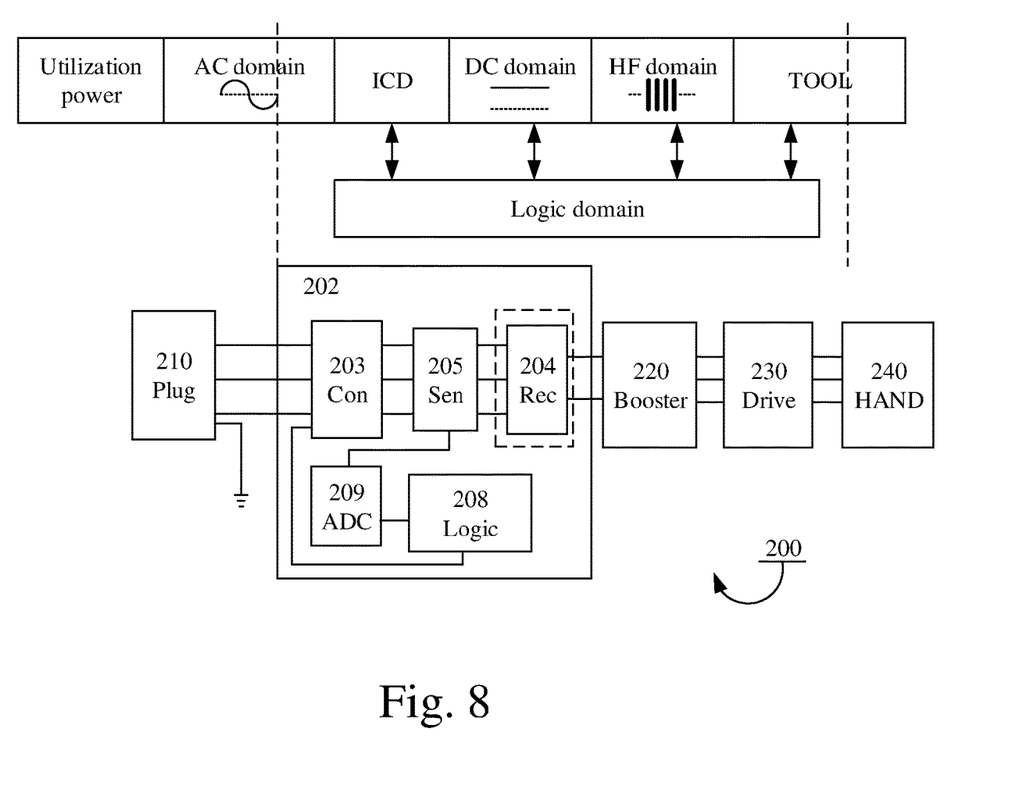
FIG. 8 shows an alternative to FIG. 2.

Since the sensor element 205 of the integrated RCD 202 may in some embodiments utilize the already present logic domain within the liquid system tool, another advantage of some of the embodiments can be achieved in that the integrated RCD may collect data from other sensors and functions present within the liquid system tool. Hence, the integrated RCD may perform a self diagnosis or a self test of its function in order to determine if it operates correctly by means of the integrated RCD. An alternative location of the sensor element 205 is upstream of the rectifier 204, as is seen in FIG. 8.

Figure 3:
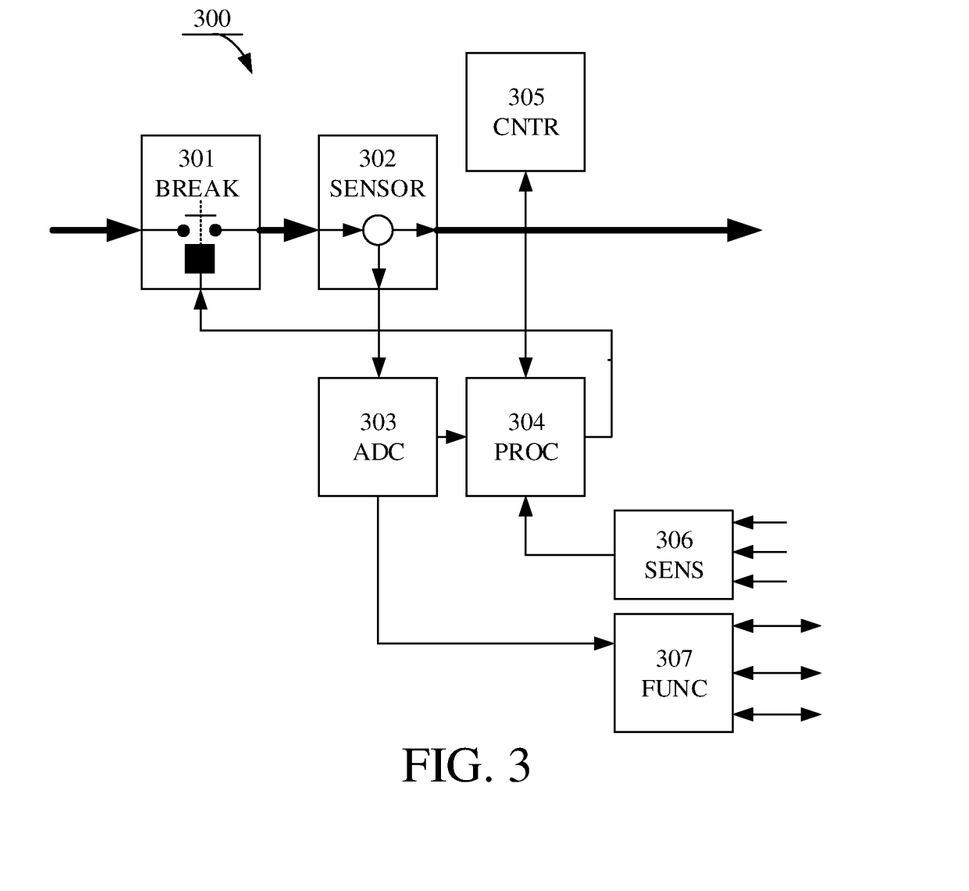
FIG. 3 shows a schematic drawing of an example integrated RCD according to some embodiments, FIGS. 4A and 4B each show a schematic drawing of a liquid system tool comprising an example integrated RCD according to some embodiments.

FIG. 3 illustrates a schematic block diagram of an integrated RCD 300 (e.g. the integrated RCD described in conjunction with any of FIGS. 1-2), for a liquid system tool, receiving sensor inputs from several different sources. The block diagram of FIG. 3 may e.g. be a more detailed block view of an integrated RCD according to some embodiments.

The liquid system tool may comprise a current circuit having a power input for receiving an alternating electrical current, AC, a rectifier (not shown) for rectifying the AC into a direct current, DC, a voltage booster (not shown) for increasing a DC voltage and a motor unit (not shown) connected to an output of the voltage booster for driving the liquid system tool.

The integrated RCD 300 may further comprise a circuit breaker 301 (e.g. the solenoid contactor relay 103/203 or breaker of FIGS. 1-2), a sensor element 302 (e.g. the sensor elements of any of FIGS. 1-2), an analog to digital converter (ADC) 303 (e.g. the ADC described in conjunction with any of the FIGS. 1-2), a processor 304 (e.g. the logic unit and/or processor described in FIGS. 1-2), a controller 305, other sensors 306 and other functions 307.

Furthermore, the sensor element 302 may be connected to an output of the rectifier and an input of the voltage booster and be configured to collect an analog current signal. Alternatively, the sensor element 302 may be located upstream of the rectifier. The ADC 303 may be configured to convert the analog current signal into a digital current signal. The processor 304 may be connected to the ADC 303, wherein the processor 304 is configured to evaluate the digital current signal and compare it to a current requirement. If the processor 304 determines that the digital current signal does not fulfill the current requirement it is further configured to break the current circuit so that no current can flow in the liquid system tool, by causing the breaker 301 to trip, e.g. by open a switch, and break the circuit.

The current requirement may in some embodiments be that the current flowing in a conductor wire should be equal to the current flowing in a return wire of the liquid system tool. Thus the digital current signal may represent the difference between the conductor current and the return current. In such case, the current requirement may be that the digital current signal is zero, and any other value will trigger the integrated RCD 300 such that it breaks the circuit.

In some embodiments, the current requirement may be a current threshold, which the digital current signal may not exceed, such as 6 mA, 10 mA or 30 mA, or that the frequency of the leaking currents may be between 0 Hz to 100 kHz. A person skilled in the art would easily realize that other values are possible, both higher and lower, and fall within the scope of the invention.

The controller 305 and processor 304 may in some embodiments be integrated into one logic unit (e.g. the logic unit 108 of FIG. 1).

In some embodiments, the other sensors 306 and other functions 307 are not a part of the integrated RCD 300, but may instead originate from other components conventionally present in the liquid system tool.

For instance, the logic unit 305, 306 may be configured to receive a measurement signal from at least one other component and compare the measurement signal to the digital current signal.

The measurement signal may e.g. be output from the other sensors 306 or the other functions 307 which may be conventionally present within the liquid system tool or within the integrated RCD 300.

For instance, in some embodiments, the liquid system tool may comprise digital logic enabling a programming of the e.g. the electrical motor to hold a certain speed and frequency. The high frequency current of the motor which may be induced by the motor unit may thus be based on a programmable parameter.

The same programmable parameter may be utilized by the processor 304 of the integrated RCD 300. Thus the integrated RCD 300 may be seen as a cognitive sensor or device being able to react to both fixed and variable parameters.

In some embodiments, the integrated RCD 300 may further comprise filters (not shown) for filtering the currents of the liquid system tool. The processor 304 may utilize a fixed programmable frequency parameter of the motor, and may tune the filters such that they are tuned in on maximum sensitivity, e.g. 20 kHz.

The programmable frequency parameter may furthermore be variable and may change over time, the processor 304 may in such case tune e.g. the filters for alternating currents such that they follow the frequency of the motor, typically in the range of 10-1000 Hz, and filters out all other unwanted alternating current frequencies. This leads to that the integrated RCD 300 keeps its sensitivity to currents having a frequency of 50 Hz.

In some embodiments, the at least one other component comprised in the liquid system tool is at least one of the voltage booster, or the motor unit. I.e. the voltage booster may comprise sensors measuring the size of incoming and outgoing voltages, these values may be utilized by the logic unit or processor of the integrated RCD 300.

Alternatively or additionally, in some embodiments, the integrated RCD 300 may further comprise a voltage observer sensor and a current observer sensor for measuring voltages and currents within the integrated RCD 300. The logic unit or processor 304 may further be configured to determine, based on the comparison of the digital current signal and the measurement signal, if the sensor 302 or other components in the integrated RCD 300 are operating correctly, and to break the current circuit if an error is detected.

If the integrated RCD 300 or the sensor 302 are operating correctly there should exist a correlation between its output values and the output values of the other sensors and functions. If the logic unit detects that the correlations are starting to differ without there actually being present any leaking currents, it may draw the conclusion that some sensor is malfunctioning and can react by breaking the current.

In some embodiments, the integrated RCD 300 may further be connected to a user display which may show an error code or simple error LED lamp indicating to an operator if sensor or other component malfunction is detected.

In some embodiments, the logic unit is configured to automatically compare the digital current signal to the measurement signal on a recurring basis, i.e. automatically perform the self test or self diagnosis without it having to be initiated by an operator of the liquid system tool. This has an advantage in that operation of the liquid system tool is safe and reliable since it does not rely on the human factor to test its function.

Thus, the integrated RCD 300 may continuously and automatically diagnose or self test itself in order to ensure proper function and maximum security.

The comparison or self diagnosis may e.g. be performed every time the current circuit or liquid system tool is powered on, i.e. every time the liquid system tool is to be used.

Additionally or alternatively, in some embodiments, the comparison or self diagnosis may be performed at recurring time intervals when the liquid system tool is in operation, e.g. every hour, once a day, every half hour, etc. In some embodiments, the self diagnosis may be performed every time the liquid system tool is powered down.

Thus, a tool having an integrated RCD 300 according to the above will be reliable and safe for a user since it continuously evaluates its own performance and function.

Figure 4A:
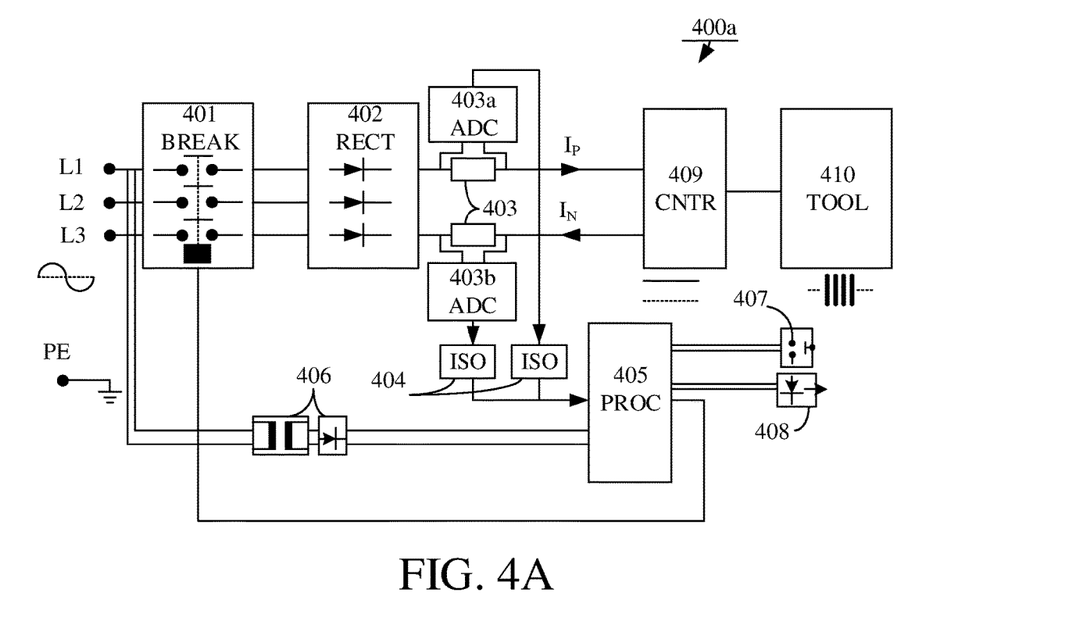
Figure 4B:
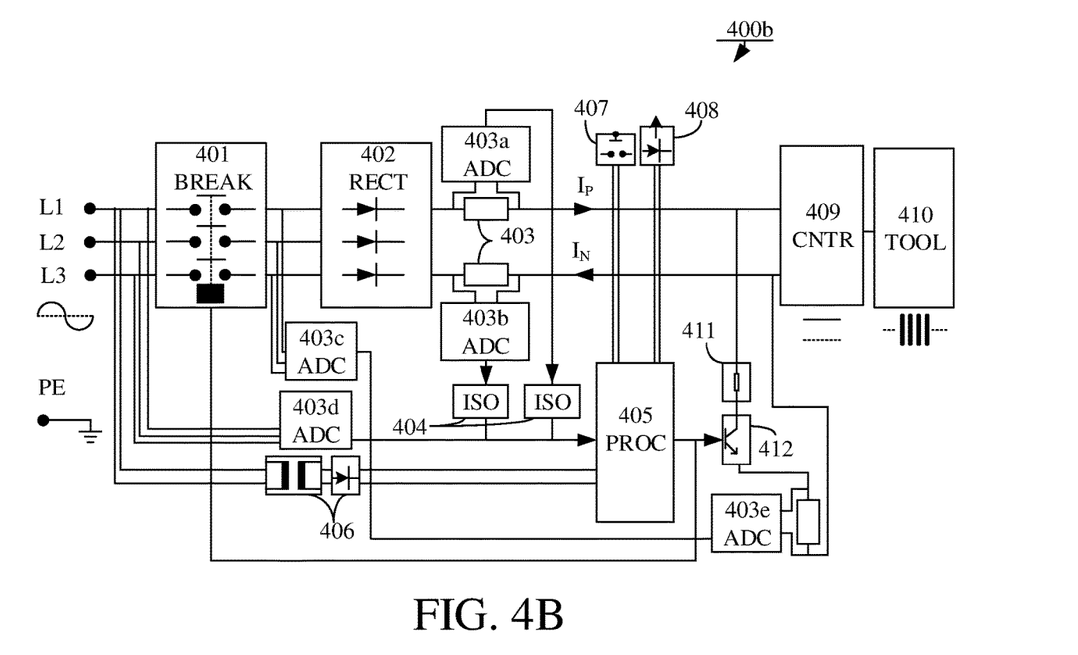

FIGS. 4A and 4B each illustrate a more detailed circuit of an example implementation of an integrated RCD 400a, 400b for a liquid system tool according to some embodiments.

The liquid system tool may e.g. comprise a current circuit having a power input (L1, L2, L3) for receiving an alternating electrical current, AC, a rectifier (RECT) 402 for rectifying the AC into a direct current, DC, a voltage booster (not shown) for increasing a DC voltage and a motor unit (not shown) connected to an output of the voltage booster for driving the liquid system tool.

The power input may e.g. be the plug 101, 220 of any of the FIGS. 1-2. The rectifier 402 may e.g. be the rectifier 104, 203 of any of the FIGS. 1-2.

The integrated RCD 400a may further comprise a breaker 401 (e.g. the breaker 103, 203, 301 of any of the FIGS. 1-3) configured to break an electrical circuit, a current transducer 403 configured to convert the current to a voltage, analog to digital converters (ADC) 403a, 403b and being connected to a pair of resistors of the current transducer 403, digital isolators (ISO) 404, a processor (PROC) 405, a power supply 406 to active parts (such as the processor 405), a user input device 407 and a status display 409.

The integrated RCD 400a may further be connected to a controller (CNTR) 409 which is in connection with e.g. a housing (TOOL) 410 of the liquid system tool. The controller 409 may be part of a DC domain in the logic domain of the liquid system tool, whereas the liquid system tool 410 may be in the HF domain in the logic domain (compare with FIG. 2).

The two resistors of current transducer 403 may be connected to a positive and negative DC-pole outputted from the rectifier. Thus the current transducer 403 may function as a sensor (e.g. the sensor element 105, 205, 302 of any of the FIGS. 1-3) which compares the current running through each DC-pole (conductor current and return current) by collecting an analog current signal from the DC-poles. In order to properly evaluate the analog current signal, it may be transmitted to the ADC 403a, 403b where it is converted into a digital current signal.

The processor 405 is configured to evaluate the digital current signal and compare it to a current requirement, wherein if the processor 405 determines that the digital current signal does not fulfill the current requirement it is further configured to break the current circuit so that no current can flow in the liquid system tool. The processor 405 may e.g. be the logic unit 108, 208 or the processor 304 of any of the FIGS. 1-3.

In some embodiments, the current transducer may collect two analog current signals, one for each resistor, and transmit them to the ADC 403a, 403b for conversion into two digital current signals. Then the logic unit may subtract one digital signal from the other and compare the remainder digital current signal to the current requirement. In such case, the current requirement may be that the remainder should be zero or below a low threshold value, and any other higher value will trigger the integrated RCD to break the circuit.

In some embodiments, the current requirement may be a current threshold, which the digital current signal may not exceed, such as 6 mA.

In some embodiments, it is preferable that the current transducer 403 is arranged directly after the rectifier 402. Here it functions as a sensor element (e.g. the sensor element 105, 205, 302 of any of the FIGS. 1-3), as elaborated on above, capable of monitoring the difference between a positive current output and a negative current output from the rectifier 402 at the two DC-poles. The current transducer should preferably be arranged where the alternating current is converted into a direct current in order to be able to detect errors resulting from both type of currents, i.e. leaking alternating currents and leaking direct currents. As a result, no extra RCD needs to be implemented for detecting DC-errors or HF-errors, which is necessary in conventional implementations.

Furthermore, the user input 407 may e.g. be a power button or lever which an operator or user of the liquid system tool may use in order to switch the tool on and off. The status display 408 may e.g. be a display which powers on when the liquid system tool is being used and displays data such as when the liquid system tool last performed a self diagnosis, or if any malfunction has been detected.

The digital isolators 404 may ensure that proper isolation is achieved between the analog and digital domain. The digital isolators may be any type of suitable conventional digital isolator. Thus, the voltage potential between the two poles Ip and In of the sensors and ADCs 403, 403a, 403b is isolated. This is also true for the high voltage potential that may exist between ADCs and the processor 405. The voltage potential between parts can vary from several hundred volts up to 1 kV.

FIG. 4B illustrates another detailed implementation of an integrated RCD according to some embodiments.

The integrated RCD 400b of FIG. 4B may, in some embodiments, share or have similar features as those described above for the integrated RCD 400a of FIG. 4A.

The liquid system tool may e.g. comprise a current circuit having a power input (L1, L2, L3) for receiving an alternating electrical current, AC, a rectifier (RECT) 402 for rectifying the AC into a direct current, DC, a voltage booster (not shown) for increasing a DC voltage and a motor unit connected to an output of the voltage booster for driving the liquid system tool.

The power input may e.g. be the plug 101, 220 of any of the FIGS. 1-2. The rectifier 402 may e.g. the rectifier 104, 203 of any of the FIGS. 1-2.

The integrated RCD 400*b* may further comprise a breaker 401 configured to break an electrical circuit, a current transducer 403 configured to convert the current to a voltage, analog to digital converters (ADC) 403*a*, 403*b* connected to a pair of resistors of the current transducer, digital isolators (ISO) 404, a processor (PROC) 405, a power supply 406 to active parts (such as the processor 405), a user input device 407 and a status display 408. The integrated RCD may further comprise a voltage observer 403*c*, 403*d*, a current observer 403*e*, a controller 412 for a break load resistor, and the break load resistor 411.

The integrated RCD 400*a* may further be connected to a controller (CNTR) 409 which is in connection with e.g. a housing (TOOL) 410 of the liquid system tool. The controller 409 may be part of a DC domain in the logic domain of the liquid system tool, whereas the liquid system tool 410 may be in the HF domain in the logic domain (compare with FIG. 2).

The two resistors of current transducer 403 may be connected to a positive and negative DC-pole outputted from the rectifier 402. Thus the current transducer 403 may function as a sensor which compares the current running through each DC-pole (conductor current and return current) by collecting an analog current signal from the DC-poles. In order to properly evaluate the analog current signal, it may be transmitted to the ADC 403*a*, 403*b* where it is converted into a digital current signal. The processor 405 is configured to evaluate the digital current signal and compare it to a current requirement, wherein if the processor 405 determines that the digital current signal does not fulfill the current requirement it is further configured to break the current circuit so that no current can flow in the liquid system tool.

The processor 405 may e.g. be the logic unit 108, 208 and/or the processor 304 of any of the FIGS. 1-3.

In some embodiments, the current transducer may collect two analog current signals, one for each resistor, and transmit them to the ADC 403*a*, 403*b* for conversion into two digital current signals. Then the processor 405 may subtract one digital signal from the other and compare the remainder digital current signal to the current requirement. In such case, the current requirement may be that the remainder should be zero or a very low threshold value, and any other higher value may trigger the integrated RCD to break the circuit.

In some embodiments, the current requirement may be a current threshold, which the digital current signal may not exceed, such as 6 mA.

In some embodiments, it is preferable that the current transducer 403 is arranged directly after the rectifier 402. Here it functions as a sensor element (e.g. the sensor element 105, 201, 302 of any of the FIGS. 1-3) capable of monitoring the difference between a positive current output and a negative current output from the rectifier 402 at the two DC-poles, as elaborated on above.

The current transducer should preferably be arranged where the alternating current is converted into a direct current in order to be able to detect errors resulting from both type of currents, i.e. leaking alternating currents and leaking direct currents as well as high frequency currents from the motor of the liquid system tool. As, a result no extra RCD needs to be implemented for detecting DC-errors, which is necessary in conventional implementations.

The digital isolators 404 ensure that proper isolation is achieved between the analog and digital domain.

The voltage observer 403*c*, 403*d* and the current observer 403*e* may enable the integrated RCD 400*b* to measure voltage and current levels of its components in order to regularly perform a self test or self diagnosis of the system as they function as additional sensors. For instance, the voltage and current being observed or measured by the respective observer should have a correlation if the components of the integrated RCD are functioning properly. If a non-correlation is detected between the observed voltage and the observed current, then it is an indication that one or more of the components of the integrated RCD is not functioning properly and should be replaced. Upon such detection, the integrated RCD may be configured to trigger, which results in a break of the power to the liquid system tool e.g. by causing the processor 405 to break the circuit by means of the breaker 401. The processor 405 may then be configured to cause the status display 409 to display an error message indicating to a user that something is malfunctioning in the integrated RCD.

In some embodiments, the voltage observer 403*c*, 403*d* and the current observer 403*c* may be implemented by means of one or more analog-to-digital converters.

In some embodiments, the integrated RCD 400*b* may receive additional sensor or functional inputs from other components comprised within the liquid system tool (compare with FIG. 3).

For instance, the processor 405 may be configured to receive a measurement signal from at least one other component comprised in the liquid system tool and compare the measurement signal to the digital current signal.

In some embodiments, the at least one other component comprised in the liquid system tool may e.g. be at least one of the voltage booster, or the motor unit. I.e. the voltage booster may comprise sensors measuring the size of incoming and outgoing voltages, these values may be utilized by the logic unit of the integrated RCD.

The logic unit may e.g. be configured to determine based on the comparison of the digital current signal and the measurement signal if the sensors is operating correctly, and to break the current circuit if an error is detected.

Figure 9A:
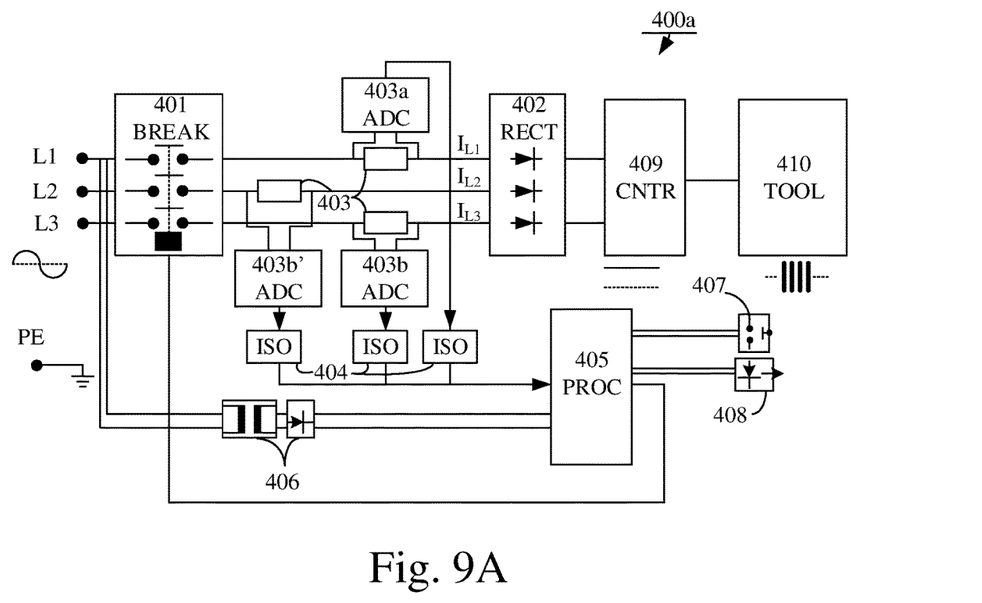
FIG. 9A shows an alternative to FIG. 4A.
Figure 9B:
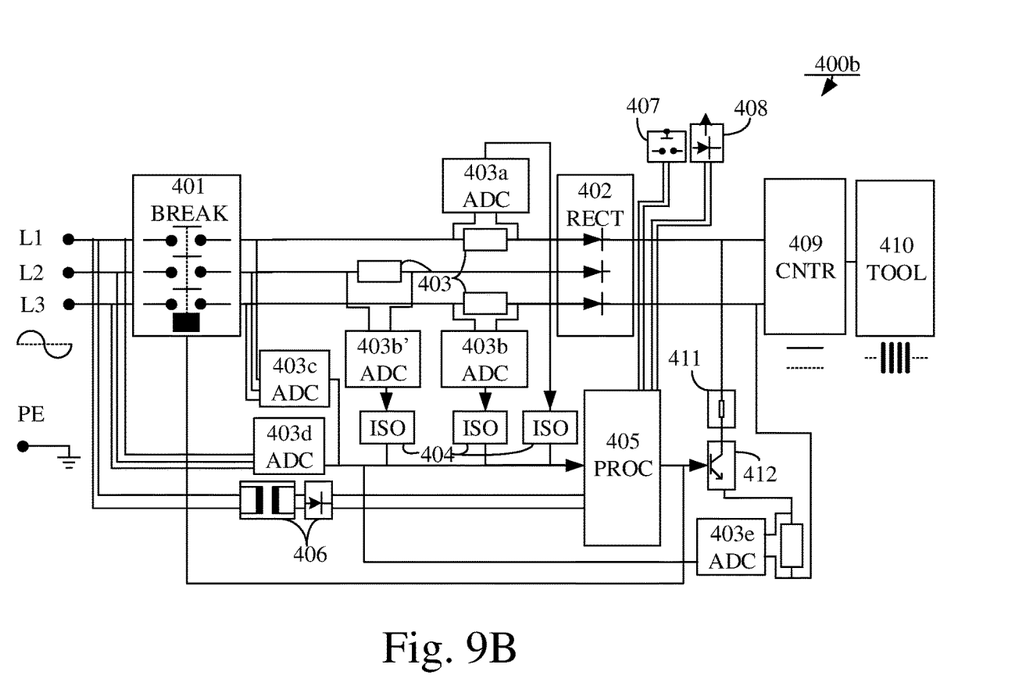
FIG. 9B shows an alternative to FIG. 4B.

FIGS. 9A and 9B illustrate alternative embodiments where the sensor element 105, 205, 302, 403*a-e* may be connected to an input of the rectifier 104, 204, 402, i.e. upstream of the rectifier. In such alternative embodiments, the sensor element 105 may comprise first, second and third shunt resistors 403 which are respectively connected to first, L1, second, L2, and third, L3, phase lines at the input of the rectifier 104, 204, 402, wherein the A/D-converter 109, 209, 303, 403*a*, 403*b* is configured to measure the analog current signal over the respective shunt resistor 403 and convert the analog current signal into the digital current signal.

In still alternative embodiments, the sensor element 105, 205, 302, 403*a-e* comprises first and second shunt resistors 403 which are respectively connected to a phase line (L) and a neutral line (N) at the input of the rectifier 104, 204, 402, wherein the A/D-converter 109, 209, 303, 403*a*, 403*b* is configured to measure the analog current signal over the respective shunt resistor 403 and convert the analog current signal into the digital current signal.

In some embodiments, the electrical circuit described in any of the FIGS. 1-4 or alternatively FIGS. 7-9 may further be driven by one phase drive, two phase drive or three phase drive.

In some embodiments, the liquid system tool described in any of the FIGS. 1-4 or alternatively FIGS. 7-9 may be a portable or stationary electrical power tool.

Figure 5:
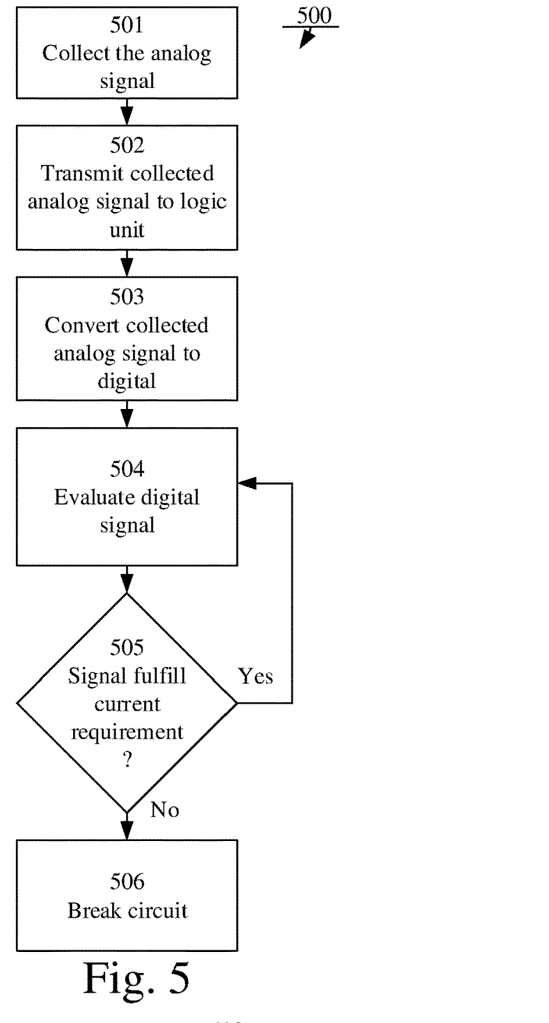
FIG. 5 shows an example method for an integrated RCD according to some embodiments.

FIG. 5 illustrates an example method 501 of an integrated residual current device, RCD, for a liquid system tool. The liquid system tool may comprise a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool.

The components and technical features of the integrated RCD and the liquid system tool may in some embodiments be the corresponding components as described in conjunction with any of the FIGS. 1-4 or alternatively FIGS. 7-9.

The power input may e.g. be the plug 101, 220, and or L1-L3 of FIGS. 1, 2 and 4 or alternatively FIGS. 7-9, and the rectifier may be the rectifier 104, 203, and 402 of FIGS. 1, 2 and 4 or alternatively FIGS. 7-9, etc.

The method 500 comprises collecting 501 an analog current signal from a sensor (e.g. the sensor element of any of the FIGS. 1-4 or alternatively FIGS. 7-9) connected to an output of the rectifier and an input of the voltage booster, or alternatively connected to an input of the rectifier, and transmitting 502 the collected analog current signal to a logic unit connected to an analog to digital converter (ADC).

The logic unit may e.g. be the logic unit 105 and/or processor 204, 304, 405 of any of the FIGS. 1-4 or alternatively FIGS. 7-9.

The method 500 also comprises converting 503 the analog current signal into a digital current signal. In some embodiments, the logic unit may be configured to perform this conversion.

When the digital current signal has been obtained, it is evaluated 504 by the logic unit and compared to a current requirement.

The logic unit may further determine 505 if the digital current signal fulfills a current requirement. The current requirement may e.g. be determined as described in conjunction with any of the previous FIGS. 1-4 or alternatively FIGS. 7-9.

If it is determined that the digital current signal does not fulfill the current requirement (No-path out of 505) then the logic unit causes a breaker to trip and break 506 the current circuit so that no current can flow in the liquid system tool.

The logic unit may e.g. output a signal which triggers a main contactor relay to trip and thus break the power.

If it is determined that the digital current signal fulfills the current requirement (Yes-path out of 505) the logic unit evaluates the digital signal again on a repeated basis.

Thus, the logic unit continuously evaluates the digital current signal and can immediately break the current circuit if the digital current signal does not fulfill the current requirement.

In some embodiments, the sensor may collect two analog current signals, and transmit them to the ADC for conversion into two digital current signals. Then the logic unit may subtract one digital signal from the other and compare the remainder digital current signal to the current requirement. In such case, the current requirement may be that the remainder should be zero, and any other value will trigger the integrated RCD to break the circuit.

In some embodiments, the current requirement may be a current threshold, which the digital current signal may not exceed, such as 2 mA, or a frequency threshold of the current such as 40, 50 or 60 Hz. Thus the subtraction of the currents should not result in a value exceeding the current threshold.

In some embodiments, the method 500 may further comprise receiving a measurement signal from at least one other component of the liquid system tool and comparing the measurement signal to the digital current signal.

The at least one other component may be comprised in the liquid system tool and may e.g. be at least one of the voltage booster, or the motor unit.

In some embodiments, the measurement signal may alternatively or additionally be output from a voltage observer and/or a current observer integrated into the integrated RCD.

The method 500 may further comprise determining based on the comparison of the digital current signal and the measurement signal if the sensor is operating correctly, and breaking the current circuit if an error is detected.

Thus the method enables the integrated RCD to perform a self test or self diagnosis of its functionality by collecting reference data which, if it deviates from a known value, indicates if a component in the integrated RCD is not functioning properly (compare with FIGS. 3 and 4).

The method 500 may further comprise automatically comparing the digital current signal to the measurement signal on a recurring basis.

The comparison may for instance be performed every time the current circuit (i.e. the liquid system tool) is powered on. Or, it may be performed at predetermined time intervals, such as once every day, every week, after 15 minutes of operation of the liquid system tool, etc. The result of the self diagnosis may then be displayed on a status display, such that a user may know when the self test was performed and if everything is operating correctly.

In some embodiments, the sensor may comprise a pair of shunt resistors connected to the output of the rectifier. As already explained above, in alternative embodiments there may instead be first, second and third shunt resistors which are respectively connected to first, second and third phase lines at the input of the rectifier, or first and second shunt resistors which are respectively connected to a phase line and a neutral line at the input of the rectifier. The method 500 may further comprise measuring the analog current signal over these shunt resistors and converting the analog current signal into the digital current signal.

Figure 6:
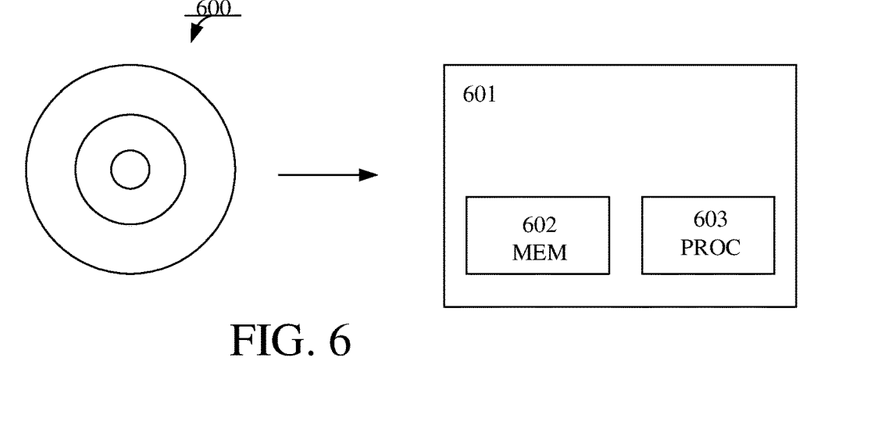
FIG. 6 shows a schematic drawing of an example computer program product according to some embodiments.

FIG. 6 illustrates a computer program product 600 according to some embodiments. The computer program product 600 may comprise a computer readable medium having stored thereon a computer program comprising program instructions. The computer program may be loadable into a data-processing unit 601 comprising a memory (MEM) 602 and a processor (PROC) 603. The computer program may be stored in the memory 602 associated to the data-processing unit, and wherein the computer program is configured to, when loaded into and run by the data-processing unit, cause the processor 603 to execute method steps according to the method 500.

Disclosed herein is a novel and inventive liquid system tool having an integrated RCD which is capable of detecting errors resulting from leakage of both alternating and direct currents within the liquid system tool.

Thanks to utilization of already present components and logic domain of the liquid system tool for implementing the integrated RCD, a cost effective and simple implementation of the liquid system tool is achieved.

Furthermore, the liquid system tool having the integrated RCD according to some embodiments disclosed herein is capable of performing an automatic self diagnosis or self test of its components which allows for errors to be quickly detected and components to be replaced before they may cause any hazardous leaking currents. Thus, the liquid system tool having the integrated RCD according to some embodiments disclosed herein is proactive and makes it safer for a user to operate the liquid system tool.

The invention claimed is:

1. A liquid system tool comprising a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool, wherein the liquid system tool has an integrated residual current device, RCD, for protecting an operator of the liquid system tool against hazardous ground fault currents, the RCD comprising:
  a sensor element connected to an output of the rectifier and an input of the voltage booster, or alternatively connected to an input of the rectifier, the sensor element being configured to collect an analog current signal,
  an analog to digital, A/D, converter configured to convert the analog current signal into a digital current signal; and
  a logic unit connected to the A/D converter, wherein the logic unit is configured to evaluate the digital current signal and compare it to a current requirement, and wherein if the logic unit determines that the digital current signal does not fulfill the current requirement, the logic unit is further configured to break the current circuit so that no current can flow in the liquid system tool.

2. The liquid system tool according to claim 1, wherein the logic unit is connected to a circuit breaker arranged at the power input, and wherein the logic unit is configured to break the current circuit by tripping the breaker if the digital current signal does not fulfill the current requirement.

3. The liquid system tool according to claim 1, wherein the sensor element comprises a pair of shunt resistors connected to the output of the rectifier, and wherein the A/D-converter is configured to measure the analog current signal over the shunt resistor pair and convert the analog current signal into the digital current signal.

4. The liquid system tool according to claim 1, wherein the sensor element comprises first, second and third shunt resistors which are respectively connected to first, second and third phase lines at the output or alternatively input of the rectifier, and wherein the A/D-converter is configured to measure the analog current signal over the respective shunt resistor and convert the analog current signal into the digital current signal.

5. The liquid system tool according to claim 1, wherein the sensor element comprises first and second shunt resistors which are respectively connected to a phase line and a neutral line at the output or alternatively input of the rectifier, and wherein the A/D-converter is configured to measure the analog current signal over the respective shunt resistor and convert the analog current signal into the digital current signal.

6. The liquid system tool according to claim 1, wherein the logic unit is configured to receive a measurement signal from at least one other component of the integrated RCD and/or of the liquid system tool and compare the measurement signal to the digital current signal.

7. The liquid system tool according to claim 6, wherein the at least one other component is at least one of a voltage observer sensor and a current observer sensor.

8. The liquid system tool according to claim 6, wherein the at least one other component is at least one of the voltage booster or the motor unit.

9. The liquid system tool according to claim 6, wherein the logic unit is configured to determine based on the comparison of the digital current signal and the measurement signal if the sensor element is operating correctly, and to break the current circuit if an error is detected.

10. The liquid system tool according to claim 6, wherein the logic unit is configured to automatically compare the digital current signal to the measurement signal on a recurring basis, or every time the liquid system tool is powered on.

11. The liquid system tool according to claim 1, wherein the electrical circuit is driven by one phase source or two phase source or three phase source, or wherein the liquid system tool is a handheld, portable, transportable or stationary electrical power tool.

12. A method for detecting residual current in a liquid system tool, wherein the liquid system tool comprises a current circuit having a power input for receiving an alternating electrical current, AC, a rectifier for rectifying the AC into a direct current, DC, a voltage booster for increasing a DC voltage and a motor unit connected to an output of the voltage booster for driving the liquid system tool, the method comprising:
  collecting an analog current signal from a sensor connected to an output of the rectifier and an input of the voltage booster, or alternatively connected to an input of the rectifier;
  transmitting the collected analog current signal to a logic unit connected to an analog to digital converter;
  converting the analog current signal into a digital current signal;
  evaluating the digital current signal;
  comparing the digital current signal to a current requirement,
  determining if the digital current signal fulfill the current requirement; and if it is determined that the digital signal current does not fulfill the current requirement:
  breaking the current circuit so that no current can flow in the liquid system tool.

13. The method according to claim 12, wherein the logic unit is connected to a mains contactor relay arranged at the power input, and wherein the method further comprises
  breaking the current circuit by tripping the mains contactor relay if it is determined that the digital current signal does not fulfill the current requirement.

14. The method according to claim 12, wherein the sensor comprises a pair of shunt resistors connected to the output of the rectifier, and wherein the method further comprises
  measuring the analog current signal over the shunt resistor pair; and
  converting the analog current signal into the digital current signal.

15. The method according to claim 12, further comprising
  receiving a measurement signal from at least one other component of the integrated RCD and/or of the liquid system tool; and
  comparing the measurement signal to the digital current signal.

16. The method according to claim 15, wherein the at least one other component is at least one of a voltage observer sensor, a current observer sensor, the voltage booster or the motor unit.

17. The method according to claim 15, further comprising
determining based on the comparison of the digital current signal and the measurement signal if the sensor is operating correctly, and
breaking the current circuit if an error is detected.

18. The method according to claim 15, further comprising automatically comparing the digital current signal to the measurement signal on a recurring basis, or performing the comparison every time the current circuit is powered on.

19. The method according to claim 12, further comprising driving the electrical circuit by one phase source, two phase source or three phase source.

20. A computer program product comprising a computer readable medium having stored thereon a computer program comprising program instructions, wherein the computer program is loadable into a data-processing unit, wherein the computer program is stored in a memory associated to the data-processing unit, and wherein the computer program is configured to, when loaded into and run by the data-processing unit, cause the data-processing unit to execute method steps according to claim 12.

* * * * *